March 27, 1962   R. D. BROOKS   3,027,106
ROTARY SAW BREAK-UP HEAD
Filed Feb. 19, 1959
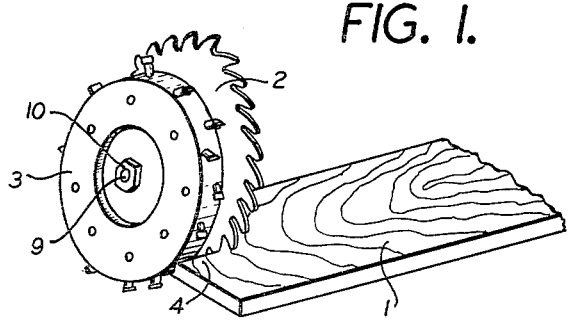
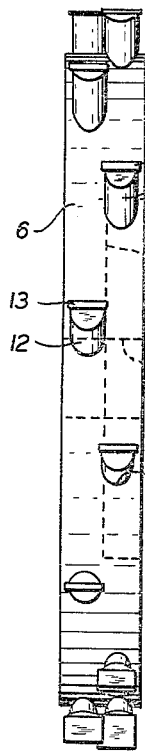
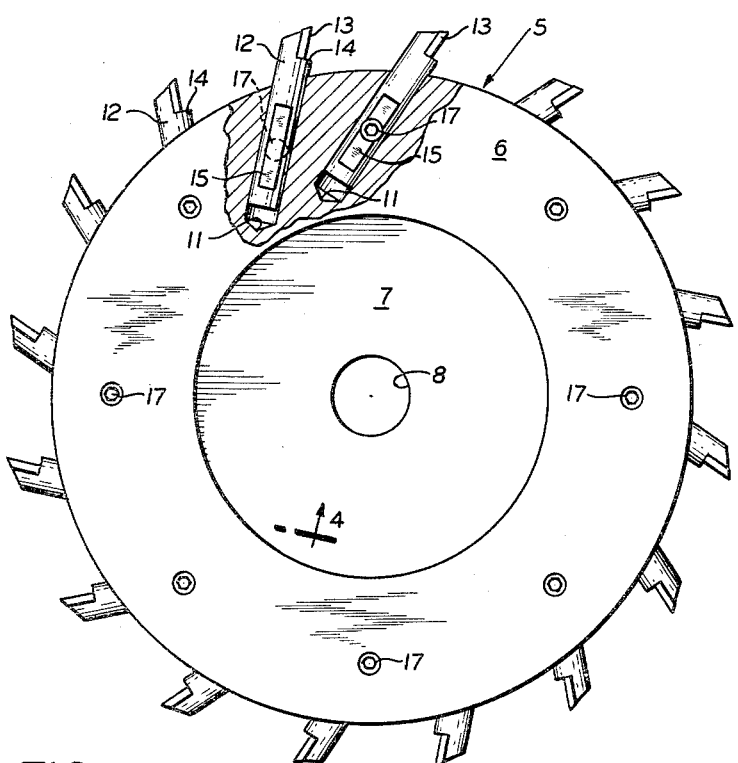
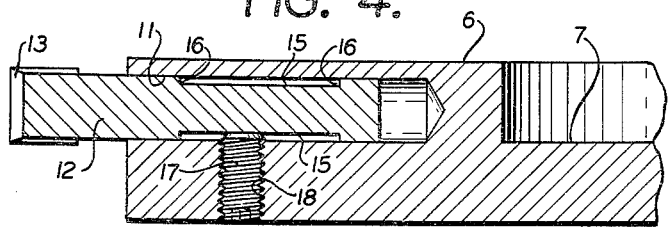
INVENTOR
*Robert D. Brooks*
BY
*George F. Hamel*
ATTORNEYS

United States Patent Office 3,027,106
Patented Mar. 27, 1962

3,027,106
ROTARY SAW BREAK-UP HEAD
Robert D. Brooks, High Point, N.C., assignor to R. Hoe & Co., Inc., New York, N. Y., a corporation of New York
Filed Feb. 19, 1959, Ser. No. 794,364
3 Claims. (Cl. 241—294)

This invention relates to break-up heads for rotary saws.

More particularly, the invention relates to break-up units for use with trim saws and which reduce the trimmed material which otherwise would be in the form of long strips to chips or smaller particles which are more easily handled and disposed of. Such devices perform much the same operation as wobble type saws but more efficiently and produce a better saw cut because of the great reduction in vibration.

It is an object of the invention to provide a break-up unit which is readily supplied in a variety of widths and diameters and which has adjustment of the cutting radius within a suitable range for use with any one saw diameter.

It is another object of the invention to provide a break-up unit having individual cutters with carbide or other wear resistant tips, which cutters can be readily replaced and removed for repair and regrinding.

A further object is to provide a break-up unit of the lightest possible construction and still having the required strength and durability.

A break-up unit embodying the invention in a preferred form will now be described with reference to the accompanying drawing, and the features forming the invention will then be pointed out in the appended claims.

In the drawing:

FIG. 1 is a isomeric showing a trim saw with break-up unit in position thereon;

FIG. 2 is a flat or end elevation view of the break-up unit;

FIG. 3 is an edge or side elevation view of the break-up unit of FIG. 2; and

FIG. 4 is an enlarged section on the line 4—4 of FIG. 2.

FIG. 1 indicates a board 1 in process of being trimmed by a rotary trim saw 2 to which is attached the break-up unit 3 of the invention. It will be observed that the end 4 of the board instead of being removed as a strip will be cut or broken into comparatively small fragments or chips by the break-up unit 3, as hereinafter described, thus providing for efficient removal of off-fall in the cutting of lumber in general and plywood, insulation board; wall board, hard board, particle, chip or flake board or acoustical tile in particular.

The break-up unit 3 comprises a disc-shaped body 5 having a thicker rim 6 and centrally recessed as at 7 and which has a central aperture 8 for fitting over the arbor 9 of the saw 2 and attached thereto as by tightening up of a nut 10 on the threaded end thereof. The rim 6 of the disc body 5 has two sets of peripheral bores 11, the bores of each set being circumferentially aligned with each other and equally spaced around the circumference and the bores of the two sets being staggered with relation to each other as shown. In the unit illustrated, there are eight such bores in each set, which spaces adjacent bores of a set apart at an angle of 45° and provides a bore of one set or the other at each 22½° of the circumference. The bores are set at an angle to the radius of the body 5, which angle may conveniently be about 30° at the circumference of the disc body 5 and receive the cutter plugs 12. Each of these plugs 12 has a carbide or other cutter tip 13 fitted in a stub 14 at the end of the plug and brazed or otherwise secured in place, and the plug body is generally cylindrical so as to fit in a bore 11 and permit sliding movement therein or removal therefrom. Each plug further has flats 15 on opposite sides of its cylindrical body, which flats terminate in shoulders 16 and cooperate with set screws 17 which are mounted in threaded bores 18 in the faces of the rim portion 6 of the disc body. It will be observed that the bores 18 are alternated in a manner similar to the bores 11, so that the bore 18 associated with a particular bore 11 enters from the more remote face of the disc body 5, thus providing maximum length of the threaded bore 18 for the set screw. Since the plugs 12 are symmetrical and have flats 15 on both sides, the plugs 12 are interchangeable both as to the bores 11 of a given set of bores and as between sets of bores. The set screws 17 are preferably of the well known Allen or countersunk hexagonal head type, so as not to protrude beyond the surface of the disc when tightened up.

The particular break-up unit selected for purposes of illustration may be made in various sizes, the disc body generally being of two inches less diameter than the saw with which used and the thickness of the body being varied according to the thickness of the trimmed material which is to be broken up and being in general a quarter inch thicker than the thickness of such material. For example, the break-up unit for a twelve inch diameter saw may have a disc body ten inches in diameter and in thickness range from three-quarters of an inch to two and one-quarter inch for breaking up trimmed material of widths from one-half to two inches. The number of cutter plugs 12 and the number of sets of such plugs may be varied accordingly. In the embodiment illustrated, there are sixteen such plugs, divided between two sets, each of which contains eight such plugs as previously mentioned. For narrower or wider trimmed material which is to be broken up, a cutter having a single set of eight plugs or three or more such sets distributed across the width of the cutter body may be utilized. For smaller or larger diameter cutters, the number of bores 11 or plugs 12 in each set may be varied and approximately in proportion to the diameter of the cutter.

As is apparent from FIG. 3, the cutter tips 13 of the plugs 12 may overlap slightly in their cutting action and preferably extend out almost flush with the faces of the rim 6 of the disc body. The disc body may be made of aluminum or similar alloy for maximum lightness and the plugs are generally made of steel with carbide tips 13 for maximum strength and durability. The range of radial adjustment of the cutters which is provided by means of the set screws 17 and flats 15 is preferably about one-half inch or slightly less so that the cutters may be adjusted to a diameter from about one-eighth inch below the cutting diameter of the saw to about one-half inch below this diameter, this range of adjustment taking care of all requirements which may be encountered.

In the unlikely event that a set screw 17 should come loose, major damage or injury to personnel will not occur, since the plug 12 is prevented from flying out under the action of centrifugal force by engagement of the end of the set screw 17 with a shoulder 16 at the end of the flat 15, so that the saw may be stopped before serious damage occurs. The individual cutter plugs 12 are interchangeable and may be removed when worn or damaged for grinding or repairing either at the mill or by returning the same to the factory for processing.

What is claimed is:

1. A break-up unit for rotary trim saws comprising a disc body having a relatively thick rim, a plurality of axially spaced sets of bores, the bores of each set being circumferentially aligned and equally spaced around the said rim and disposed at an angle to the disc radius, and the bores of the different sets being circumferentially staggered with relation to each other, interchangeable cutter plugs carried in the said bores and having flats on opposite sides, and screw means for engaging the said flats for detachably holding the said plugs in fixed position in the said bores.

2. A break-up unit according to claim 1, in which the said flats have shoulders at their ends, providing a predetermined range of radial adjustment of said cutters.

3. A break-up unit for rotary trim saws comprising a disc body having a relatively thick rim, a plurality of axially spaced sets of bores, the bores of each set being circumferentially aligned and equally spaced around the said rim and disposed at an angle to the disc radius, and the bores of the different sets being circumferentially staggered with relation to each other, interchangeable cutter plugs carried in the said bores, the said plugs having flats on opposite sides, and screw means for detachably holding the said plugs in fixed position in the said bores, the said screw means comprising set screws for the said sets of bores operable from the two sides of the disc body, the set screws for each set of bores being located toward the more remote face of the disc.

References Cited in the file of this patent

UNITED STATES PATENTS

| | | |
|---|---|---|
| 97,484 | Davis | Dec. 7, 1869 |
| 1,088,085 | McLean | Feb. 24, 1914 |
| 1,705,994 | Peterson | Mar. 19, 1929 |
| 1,971,428 | Riordan | Aug. 28, 1934 |
| 2,121,202 | Killgore | June 21, 1938 |
| 2,282,919 | Zempel | May 12, 1942 |
| 2,390,967 | Swenson et al. | Dec. 11, 1945 |
| 2,857,111 | Clark | Oct. 21, 1958 |
| 2,865,572 | Lannert | Dec. 23, 1958 |

FOREIGN PATENTS

| | | |
|---|---|---|
| 12,792 | Sweden | July 20, 1901 |
| 249,788 | Germany | Dec. 10, 1910 |